(12) United States Patent
Nussbaumer et al.

(10) Patent No.: US 7,422,686 B2
(45) Date of Patent: Sep. 9, 2008

(54) CELLULOSE HYDRATE ULTRAFILTRATION MEMBRANES AND METHOD FOR THEIR PRODUCTION

(75) Inventors: Dietmar Nussbaumer, Göttingen (DE); Hans-Heinrich Hörl, Bovenden (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 330 days.

(21) Appl. No.: 11/264,928

(22) Filed: Nov. 1, 2005

(65) Prior Publication Data

US 2006/0096912 A1    May 11, 2006

(30) Foreign Application Priority Data

Nov. 8, 2004   (DE) .................. 10 2004 053 787

(51) Int. Cl.
*B01D 39/00* (2006.01)
*B01D 39/14* (2006.01)
*B01D 71/10* (2006.01)
*B29D 65/00* (2006.01)

(52) U.S. Cl. .................. 210/500.29; 210/500.27; 210/500.3; 210/500.32; 210/500.31; 264/41

(58) Field of Classification Search ............ 210/500.27, 210/500.29, 500.3, 500.31, 500.32, 500.33, 210/500.23, 493.4; 264/41, 187; 96/4, 10; 510/292

See application file for complete search history.

(56) References Cited

U.S. PATENT DOCUMENTS

| | | | | |
|---|---|---|---|---|
| 3,772,072 A | * | 11/1973 | Brown et al. ................. | 427/245 |
| 4,147,622 A | * | 4/1979 | Nussbaumer ................ | 210/651 |
| 4,176,070 A | * | 11/1979 | Sakurada et al. ........ | 210/500.23 |
| 4,219,517 A | * | 8/1980 | Kesting ...................... | 264/49 |
| 4,234,528 A | * | 11/1980 | Nussbaumer et al. ......... | 264/41 |
| 4,543,221 A | * | 9/1985 | Chen et al. ..................... | 264/41 |
| 5,494,488 A | * | 2/1996 | Arnoldi et al. .............. | 510/292 |
| 5,562,827 A | * | 10/1996 | Schmidt et al. .......... | 210/493.4 |
| 6,344,239 B1 | * | 2/2002 | Asai et al. ................... | 427/212 |
| 2006/0096912 A1 | * | 5/2006 | Nussbaumer et al. .. | 210/500.29 |

FOREIGN PATENT DOCUMENTS

EP    0 762 929 B1    5/1995

* cited by examiner

*Primary Examiner*—Ana M Fortuna
(74) *Attorney, Agent, or Firm*—Chernoff Vilhauer McClung & Stenzel, LLP

(57) ABSTRACT

There is disclosed a process for the production of cellulose hydrate ultrafiltration membranes having improved filtration performance and the ultrafiltration membranes produced by the process.

16 Claims, 5 Drawing Sheets

CELLULOSE HYDRATE ULTRAFILTRATION MEMBRANES AND METHOD FOR THEIR PRODUCTION

CROSS-REFERENCE TO RELATED APPLICATIONS

Pursuant to 35 USC 119, the priority of DE 10 2004 053 787.9 filed Nov. 8, 2004 is claimed.

BACKGROUND OF THE INVENTION

Cellulose hydrate ultrafiltration membranes are usually produced by saponification from cellulose ester ultrafiltration membranes. Cellulose ester ultrafiltration membranes are made mostly of cellulose acetates, such as cellulose diacetate and cellulose triacetate; however, they can be also produced from cellulose propionates, cellulose butyrates, cellulose acetobutyrates and mixtures thereof.

Unlike membranes produced from cellulose esters or from synthetic polymers, the advantages of cellulose hydrate membranes exhibit high solvent resistance, higher temperature stability and lower nonspecific adsorption. These advantageous characteristics of cellulose hydrate membranes can be offset in certain applications by the disadvantage comprising relatively expensive production. The characteristics of the membranes are altered by saponification, i.e., they are modified to higher "molecular weight cut offs" (hereinafter abbreviated as "cut off" or "c.o."), a term of art used in membrane technology to indicate a membrane's retention capability. A higher cut off number means that the membrane has a lower capability to retain substances having a lower molecular weight. In general, there is no simple relationship between the cut off of the starting cellulose ester membrane (for example, a cellulose acetate membrane) and the cut off of the cellulose hydrate membrane created by saponification of the starting membrane.

A manifestation of this general rule is that, under identical saponification conditions, cellulose acetate membranes having a given cut off can yield cellulose hydrate membranes having different cut offs, depending on the manner in which the cellulose acetate membrane was manufactured. A general rule is that the ratio of flux to cut off of membranes manufactured from cellulose acetate and from synthetic polymers is significantly more advantageous than that of membranes manufactured from cellulose hydrates; this is the main obstacle to obtaining lower cut offs for cellulose hydrate ultrafiltration membranes.

In particular, in the manufacture of small-pored cellulose hydrate ultrafiltration membranes having an approximate cut off in the range of 50 Daltons (abbreviated as Da) and 10 kDa, it is particularly difficult to reliably adjust the porosity of the membrane. A reliable adjustment of the porosity can be achieved only at the level of relatively low through-flow or flux rates, when for example very high polymer concentration and/or a smaller amount of a swelling agent are used in the casting solution during the production of the starting cellulose ester membranes. These measures make it possible to reduce the cut off of the starting cellulose acetate membranes to such an extent that saponification achieves the desired cut off. However, in addition to an unfavorable flux:rejection ratio, another disadvantage of this method is that the cut off of the resulting cellulose hydrate membrane is predetermined by the makeup of the casting solution. And when the starting cellulose acetate membranes are produced in separate machines, which is usually the case, this method is expensive because storage of the cellulose acetate membranes is required.

According to another known prior art method (EP 0 762 929 B1) of making cellulose hydrate ultrafiltration membranes, the membranes are crosslinked following saponification of the cellulose ester membranes. Although such membranes have greater chemical stability, in particular in relation to alkaline compounds and cellulose-decomposing enzymes (cellulases), different cut offs are nevertheless obtained from identical cellulose acetate starting membranes, depending on the degree of crosslinking. However, the flux:retention ratio is usually no more favorable than when crosslinking is not employed.

Accordingly, a principal object of the invention is to provide a cellulose hydrate ultrafiltration membrane which has improved filtration characteristics, in particular improved flux for a given cut off class.

BRIEF SUMMARY OF THE INVENTION

The invention provides a process for making cellulose hydrate ultrafiltration membranes and to such membranes made by the process. Such membranes provide improved filtration performance, in particular an improved ratio of the membrane's flux to its rejection.

In particular, the invention provides a cellulose hydrate ultrafiltration membrane produced by a process comprising the following steps:
 (a) providing a cellulose ester ultrafiltration membrane;
 (b) tempering the cellulose ester ultrafiltration membrane of step (a) in a tempering medium; and
 (c) saponifying or hydrolyzing the tempered cellulose ester ultrafiltration membrane of step (b).

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
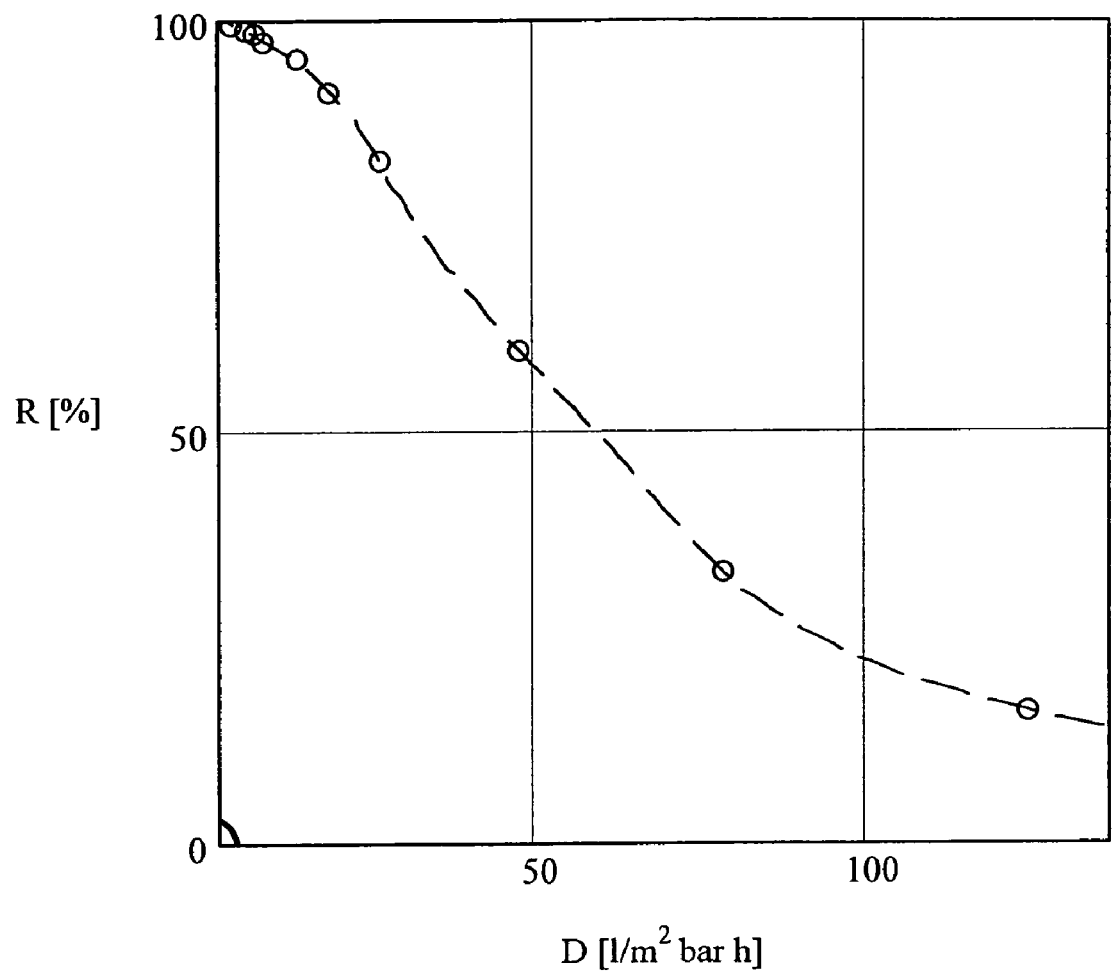
FIG. 1 is a graph of the data in Table 4 of an optimal flux/rejection relationship wherein the dashed line represents the optimum relationship between flux and rejection.

As noted above, membranes are generally categorized according to molecular weight cut off, which is given in Daltons (Da), based on their capability to retain molecules having a certain molecular weight. The term "cut off" is usually employed in membrane technology to classify ultrafiltration membranes according to their retention capability. This concept is based on the assumption that dissolved substances whose molecular weight exceeds a certain limiting value will be retained by ultrafiltration membranes having corresponding limits. Because the determination of the cut off is not standardized, the cut off values that are listed by individual membrane manufacturers ("nominal cut off values") for various types of membranes are in many cases not comparable. For that reason, it is convenient to assign cellulose hydrate membranes to cut off classes according to median values of measured values of their filtration performance, as described below. The term "ultrafiltration membrane" is generally understood to mean a membrane having a pore size in the range of from 1 to 100 nm, and which is capable of retaining macromolecules in the molecular weight range of from 500 to 1,000,000 Da.

The flux and rejection performance of ultrafiltration membranes may be measured using a standardized 0.9 wt % saline solution containing different test substances, namely, vitamin B12 (B12; MW=1.36 kDa), Inulin (Inu; MW=5 kDa) and Cytochrome C (Cyt; MW=12.4 kDa). Such performance tests were conducted with eight commercially available ultrafiltration membranes using test substances from a number of commercial laboratory samples having at least three different batch designations, making it possible to assume that the values obtained were representative values. The results are set forth in Table 1 below, where D represents flux and R represents rejection of the test substances.

TABLE 1

| Membrane | D* | $R_{B12}$ (%) | $R_{Inu}$ (%) | $R_{Cyt}$ (%) | Cut Off Class |
|---|---|---|---|---|---|
| Amicon ® YM1 | 4.23 | 93.8 | Not determined | Not determined | 1 kDa |
| Millipore ® RC 1K | 4.83 | 93.2 | Not determined | Not determined | 1 kDa |
| Millipore ® RC 5K | 7.0 | 87.3 | 94.4 | 100 | 3 kDa |
| Amicon ® YM3 | 7.93 | 71.7 | 96.9 | Not determined | 3 kDa |
| Millipore ® RC 3K | 8.28 | 63.4 | 97.4 | Not determined | 3 kDa |
| Hydrosart ® 5K | 14.6 | 65.0 | 98.1 | 99.9 | 3 kDa |
| Millipore ® RC 10K | 22.7 | 56.1 | 88.7 | 98.0 | 5 kDa |
| Hydrosart ® 10K | 53.7 | 30.5 | 69.7 | 98.7 | 10 kDa |

*D in units of $L/m^2 \cdot h \cdot bar$

The retaining power of a membrane is characterized by its so-called rejection (R), which is given as a quotient expressed as a percentage (%) of the starting concentration of the medium to be filtered (a) less the permeate concentration (b) divided by the starting concentration (a), i.e., $R=[(a-b)/a]\times 100$. In general, the concentration of the medium (a) increases during measurement of the membrane's rejection, which is reflected mathematically. The relationship between a membrane's flux and its rejection is an essential performance criterion of ultrafiltration membranes, because this criterion determines whether ultrafiltration may be carried out in an economical manner for a given cut off value.

The term "flux" as applied to an ultrafiltration membrane is taken to be its hydraulic permeability, measured with water or with an aqueous saline solution (usually 0.9 wt %).

Ultrafiltration membranes can have a symmetrical structure throughout the entire cross-section of the membrane, meaning substantially uniform pore sizes, or can have an asymmetrical structure. The latter exhibits a pore size gradient throughout the entire cross-section of the membrane. Asymmetrical membranes of this type typically have the smallest pores in or next to one surface of the membrane, which is known as the membrane "skin." The increase of the pore size between the membrane's "skin" surface and the opposite surface of the membrane is generally gradual, with the smallest pores typically located on the "skin" side and the largest pores on the opposite side of the membrane.

The cellulose ester ultrafiltration membranes used as starting membranes in the process of the invention are made in conventional fashion known in the art. Cellulose ester ultrafiltration membranes can be made from cellulose monoacetate, cellulose diacetate, cellulose triacetate, cellulose propionate, cellulose butyrate and cellulose acetobutyrate or other suitable cellulose esters; or from cellulose nitrates, methyl cellulose or ethyl cellulose, as well as from mixtures of all of the foregoing. Of these, cellulose acetate, in particular cellulose diacetate, is particularly preferred.

Prior to saponification, the cellulose ester ultrafiltration membrane is tempered by heat treatment in a suitable tempering medium. The temperature during the tempering step is preferably in the range from 40° C. to the boiling point of the tempering medium, and a temperature from approximately 60° C. to approximately 80° C. is particularly preferred. The tempering medium can be an organic solvent, such as an alcohol, or an aqueous medium, preferably the latter.

The tempering medium preferably contains one or more additives which impart a dissolving or softening effect on the cellulose ester. Suitable additives include acids, particularly carboxylic acids such as acetic acid, and water-soluble softeners for cellulose esters such as diacetin, triacetin and sulfolane. Although excellent results can be obtained with diacetin and triacetin, for economic reasons, acetic acid is preferred as an additive for the tempering medium. There are no particular limitations with respect to the concentration of the additive in the tempering medium. The concentration of the additive in the tempering medium can be up to about 50 wt %, preferably from 0.1 to 50 wt %, and most preferably from 10 to 30 wt %.

According to a particularly preferred embodiment of the invention, a tempering medium comprising water and acetic acid is employed, wherein the acetic acid concentration is from 5 to 50 wt %, more preferably from 10 to 30 wt %. When diacetin and/or triacetin in water is employed as a tempering medium, the concentration of the additive(s) is from 0.1 to 50 wt %, preferably from 0.1 to 30 wt %.

The exposure time of the cellulose ester membrane to the tempering medium will depend on the temperature of the tempering medium and possibly also on any additive in the tempering medium. The duration of the temperature appears to have no significant influence on the tempering effect, as long as a minimum exposure time is met, which guarantees adaptation of the membrane to both the temperature and concentration of additive (if used). The upper limit of the exposure time of the cellulose ester membrane to the tempering medium is determined by that time period which could cause a chemical conversion of the cellulose ester membrane, for example by hydrolysis. In other words, the time of exposure of the cellulose ester membrane to the tempering medium is chosen so as to ensure that there will be no premature hydrolysis or saponification of the cellulose ester membrane. A preferred exposure time is from 0.1 second to 1 hour, more preferably from 10 seconds to 3 minutes.

The extent of the tempering effect will depend on the highest temperature in the tempering medium in conjunction with the highest concentration of any additive which results in an effect on the cellulose ester membrane. This means that, in batch processing, the cooling of the tempering medium or the rinsing of the additive from the membrane may take place over a longer time period, but has no influence on the tempering effect achieved. The tempering step can therefore terminate at the same time as the rinsing of the additive from the membrane and/or at the same time as the cooling of the tempering medium.

When saponification is carried out without such rinsing or cooling steps, e.g., during a continuous process, the tempered membrane is fed directly into and through the saponification bath, the composition of which must be maintained constant e.g., by continuously supplying fresh saponification bath. Otherwise, the concentration of the hydrolysis byproduct (e.g., alkali acetate) will increase in the saponification bath.

Surprisingly, it was determined that the tempering of the cellulose ester starting membrane exerts a decisive influence on the cut off of the resulting cellulose hydrate ultrafiltration membrane after the saponification, and that cellulose hydrate ultrafiltration membranes which are manufactured from tempered cellulose ester membranes display a superior flux:rejection ratio.

After the tempering step, the tempered cellulose ester ultrafiltration membrane is saponified in a suitable medium, whereby the cellulose hydrate ultrafiltration membrane of the invention is formed. No particular limitations are imposed on the saponification medium, so long as the medium is suitable for the saponification of a cellulose ester, preferably for substantially complete saponification. As previously mentioned, the saponification of the tempered cellulose ester ultrafiltration membrane can be carried out in an organic solvent, in particular in a protic solvent such as methanol or ethanol, or in an aqueous medium, preferably the latter. When an aqueous medium is used as the saponification medium, it preferably has a pH>7, i.e., a basic medium. The saponification medium will preferably include an alkaline compound; particularly preferred is an alkali metal carbonate such as sodium carbonate, and/or an alkali metal hydroxide, such as sodium hydroxide. A particularly preferred saponification medium comprises an aqueous solution of sodium or potassium carbonate and/or sodium or potassium hydroxide.

The temperature of the saponification medium can be from 5° C. to the boiling point of the saponification medium, while a temperature in the range from room temperature to about 80° C. is preferred.

According to another preferred embodiment of the invention, the cellulose hydrate ultrafiltration membrane obtained after the tempering and saponification steps can be crosslinked in order to increase its chemical resistance. Suitable crosslinking means include any conventional means known to a person skilled in the art that can be used for crosslinking cellulose. When a crosslinking compound is used, it should contain at least two functional groups reactive with the —OH groups of cellulose. Two such preferred compounds are a diepoxide and a diisocyanate. Particularly preferred crosslinkers include butylene glycol diglycide ether and 5-ethyl-1,3-diglycidyl-5-methyl hydantoin. The crosslinking can take place in an organic solvent, in an aqueous medium, or in a mixture of water and an organic solvent, preferably in a mixture of water and an organic solvent such as diglyme. It is further preferred to use a crosslinking catalyst such as sodium hydroxide in order to speed up the crosslinking step.

As an exemplary measure of the chemical resistance of a crosslinked cellulose hydrate ultrafiltration membrane prepared according to the invention, such a membrane is preferably insoluble in a 10 wt % aqueous solution of sodium hydroxide at 7° C.

Adjustment to the desired cut off of the membrane can be controlled by, among other things, the tempering parameters (type of the additive and its concentration and temperature), and by the crosslinking parameters (crosslinking means and its concentration, crosslinking catalyst and its concentration, crosslinking time period, crosslinking temperature and possibly also the type and the concentration of an inert organic solvent).

To attain higher fluxes for the cellulose hydrate ultrafiltration membrane, a lower cut off such as 500 Da can be achieved by utilizing a high tempering temperature and/or a high concentration of a suitable additive in the tempering medium. If a particularly high chemical resistance of the membrane is sought, lower cut offs can be realized preferably with a high degree of crosslinking of the tempered and saponified membrane.

While the same cut off of a cellulose ester ultrafiltration membrane can be achieved using a combination of the tempering, saponification and crosslinking conditions used, the flux of such membranes vary widely, as shown in Example 1. The invention also makes it possible to manufacture different intermediate products from a starting membrane, which represents a considerable simplification from the production technology viewpoint with respect to storage of intermediate products.

The cellulose hydrate ultrafiltration membrane of the invention can be manufactured with a cut off in different classes from 500 Da to 10 kDa, and with a flux of at least 2 $L/m^2 \cdot h \cdot bar$ for a cut off in the 500 Da class; a flux of at least 10 $L/m^2 \cdot h \cdot bar$ in the 1 kDa cut off class; a flux of at least 25 $L/m^2 \cdot h \cdot bar$ in the 3 kDa cut off class; a flux of at least 30 $L/m^2 \cdot h \cdot bar$ in the 5 kDa cut off class; and a flux of at least 60 $L/m^2 \cdot h \cdot bar$ in the 10 kDa cut off class.

The membrane of the invention with a cut off in the 500 Da class has, as mentioned above, a flux of at least 2 $L/m^2 \cdot h \cdot bar$, more preferably at least 4 $L/m^2 \cdot h \cdot bar$.

The membrane of the invention with a cut off in the 1 kDa class is has a flux of at least 10 $L/m^2 \cdot h \cdot bar$, preferably at least 13 $L/m^2 \cdot h \cdot bar$, more preferably at least 15 $L/m^2 \cdot h \cdot bar$, and most preferably at least 20 $L/m^2 \cdot h \cdot bar$.

The cellulose membrane of the invention with a cut off in the 3 kDa class has a flux of at least 25 $L/m^2 \cdot h \cdot bar$, preferably at least 30 $L/m^2 \cdot h \cdot bar$, and most preferably at least 40 $L/m^2 \cdot h \cdot bar$.

The membrane of the invention with a cut off in the 5 kDa class has a flux of at least 30 $L/m^2 \cdot h \cdot bar$, preferably at least 40 $L/m^2 \cdot h \cdot bar$, and most preferably at least 50 $L/m^2 \cdot h \cdot bar$.

The membrane of the invention with a cut off in the 10 kDa class has a flux of at least 60 $L/m^2 \cdot h \cdot bar$, preferably at least 70 $L/m^2 \cdot h \cdot bar$, and most preferably at least 80 $L/m^2 \cdot h \cdot bar$.

The membranes of the invention are preferably provided with a porous support deployed between both sides of the membranes, preferably in the form of an integral non-woven fabric support, which means that the membrane meshes with the non-woven fabric. The non-woven fabric is preferably made from a polyester, from polypropylene, or from polypropylene coated with polyethylene.

The membrane of the invention may be in any form, including hollow fibers, tubes and flat sheets.

The membranes of the invention display superior solvent resistance and temperature stability and a low non-specific adsorption. Such membranes in the cut off class of from 500

Da to 10 kDa display a median flux for a 0.9 wt % saline solution which is at least 10% higher than the performance of known cellulose hydrate ultrafiltration membranes in the same cut off class. As previously mentioned, a comparison of membrane rejection performances cannot be based on the nominal cut offs provided by the manufacturers, because manufacturers use different designations for their products. That is why a classification of membrane types according to cut off classes was carried out in the present application based upon the rejection of the three test substances previously noted, i,e., vitamin B12, Inulin, and Cytochrome C. The classification is based on an examination of 40 commercially available membranes covering the entire cut off spectrum. In the cut off range of 500 Da to 10 kDa, the % rejection of the three test substances are set forth in Table 2, using the same abbreviations as in Table 1.

TABLE 2

| Cut Off Class | $R_{B12}$ (%) | $R_{Inu}$ (%) | $R_{Cyt}$ (%) |
|---|---|---|---|
| 500 Da | >96 | (100) | (100) |
| 1 kDa | 90-96 | (100) | (100) |
| 3 kDa | 62-90 | (100) | (100) |
| 5 kDa | <62 | >80 | (100) |
| 10 kDa | (<62) | <80 | >98 |

The values of rejections listed in parentheses in Table 2 do not represent assigned values, but instead are based on experience reflecting the minimum rejection for the test substance with the lowest molecular weight. With respect to eight commercially available cellulose hydrate ultrafiltration membranes, Table 3 lists the trade names, manufacturer's references and the cut off classification on the basis of median values (see Table 1) according to the criteria set forth above. All the named membranes are asymmetric membranes reinforced with an integral non-woven fabric.

TABLE 3

| Membrane Trade Name | Manufacturer's Reference | Cut Off Class |
|---|---|---|
| Amicon ® YM1 | Ultracell Amicon ® YM1 | 1 kDa |
| Millipore ® RC 1K | Ultracell PLAC | 1 kDa |
| Millipore ® RC 5K | Ultracell PLCC | 3 kDa |
| Amicon ® YM3 | Ultracell Amicon ® YM3 | 3 kDa |
| Millipore ® RC 3K | Ultracell PLBC | 3 kDa |
| Hydrosart ® 5K | Sartorius 144 29 | 3 kDa |
| Millipore ® RC 10K | Ultracell PLGC | 5 kDa |
| Hydrosart ® 10K | Sartorius 144 39 | 10 kDa |

Cellulose hydrate ultrafiltration membranes with a cut off class of 500 Da are not currently commercially available and for three of the membranes in Table 3 (Millipore® RC 5K, Hydrosart® 5K, and Millipore® RC 10K), the measured cut off classification was lower than the nominal cut off specified by the manufacturers.

The following Examples are provided by way of illustration only, and are not intended to limit the invention in any respect.

EXAMPLE 1

Three asymmetric cellulose acetate membranes provided with a fabric support and having a cut off of 1 kDa, a flux D of 210 L/m$_2$·h·bar (measured with a 0.9 wt % saline solution) and a rejection for Cytochrome C from equine heart (MW=12.4 kDa) of 35%, were tempered for 1 minute in various tempering solutions, then saponified and in some cases crosslinked. As a control, one such membrane was not tempered prior to saponification. All the membranes were tested for performance by measuring flux and rejection as detailed below.

The tempering baths were 10 wt % and 20 wt % aqueous acetic acid solutions heated to various temperatures between 60° C. and 85° C. The saponification bath was a 10 wt % aqueous sodium carbonate solution containing 0.4 wt % sodium hydroxide held at 60° C. The crosslinking solution was a 20 wt % aqueous butylene glycol diglycide ether (crosslinking agent) solution containing 0.4 wt % sodium hydroxide as a catalyst and held at room temperature. Flux (D) and rejection (R) measurements were made with a 0.9 wt % saline solution containing vitamin B12. The results are shown in Table 4.

Flux and rejection values were measured as follows. The membrane to be tested was inserted dry into an ultrafiltration device provided with a magnetic stirrer and 10 mL of a 0.9 wt % saline solution was filtered at a pressure of 4 bar. Flux was calculated from the time required for filtration. After that, the device was filled with 10 mL of the test solution (0.01 wt % vitamin B12 in 0.9 wt % saline solution) and 9.5 mL of the test solution was filtered at 4 bar. The test solution remaining in the filtration device was rinsed twice with 10 mL each time, which concluded process with the filtration device. Then the filtration device was filled with about 4 mL of the saline solution, and a further 2 mL were filtered. The combined filtrates were filled up to 12 mL and mixed. The extinctions of the test solution (Est) and of the combined filtrates (Efiltr) were then measured in a 10 mm cuvette made from quartz glass at 550 nm and $R_{B12}$ is calculated as indicated below, whereby the increasing concentration of the medium is mathematically accounted for during the measurement of the rejection:

$$R_{B12}[\%] = 100 + 33{,}378 \cdot \ln\left(1 - \frac{E_{filtr}}{E_{st}}\right)$$

TABLE 4

| Tempering Solution | Non-Crosslinked | | Crosslinking Time 24 hours | | Crosslinking Time 168 hours | |
|---|---|---|---|---|---|---|
| % additive & Temperature | D* | $R_{B12}$ (%) | D* | $R_{B12}$ (%) | D* | $R_{B12}$ (%) |
| Untempered | 150 | 0 | 30.1 | 64.6 | 5.38 | 91.3 |
| 10% additive 80° C. | 82.8 | 9.7 | 16.2 | 92.0 | 3.76 | 98.5 |
| 20% additive 60° C. | Not determined | Not determined | 16.3 | 92.8 | 3.82 | 98.3 |
| 20% additive 80° C. | 51.5 | 46.8 | 9.2 | 98.8 | 2.85 | 99.4 |

D* in units of L/m$^2$ · h · bar

In addition to the test results shown in Table 4, other data were obtained from other tests as follows. When tempering was conducted with a 10 wt % acetic acid solution at 70° C., the initial D value of 210 fell to 128 L/m$^2$·h·bar and rose after saponification to 136 L/m$^2$·h·bar; when tempering was conducted with the same tempering solution at 85° C., the D value fell to 18 L/m$^2$·h·bar and rose after saponification to 109 L/m$^2$·h·bar (R values were not determined in these two cases). After saponification of the untempered membrane, the values were $R_{Cyt}$=10% and D=150 L/m$^2$·h·bar. It should be noted that although flux D was strongly reduced with tempering, tempered membranes showed an increased flux following saponification. On the other hand, untempered membranes displayed a decreased flux (see in this context also Table 5 in Example 2: after tempering with 5% diacetin at 85° C., no flux at all was measurable on the cellulose acetate membrane, but after saponification, a flux of 63 L/m²·h·bar was achieved).

The values reported in Table 4 demonstrate that the desired cut off ranges can also be achieved with sufficiently high crosslinking (see data for the untempered membrane with a crosslinking time of 168 hours). The increase of $R_{B12}$ with a greater additive concentration (compare 10% and 20% additive at 80° C.) means that one can expect that this will be the case even without crosslinking, by simply adjusting the % additive in the tempering solution. However, a comparison of the fluxes achieved with the same rejection level demonstrates the superiority of the inventive method in samples which were tempered with 10% acetic acid at 80° C. and with 20% acetic acid at 60° C. (which leads to comparable results), higher values of $R_{B12}$ were achieved already after a crosslinking time period of only 24 hours than the values of untempered samples obtained after a crosslinking time period of 168 hours, and three times the flux was attained.

EXAMPLE 2

Example 1 was substantially repeated, with the exceptions that the tempering solution contained various concentrations of diacetin as an additive instead of acetic acid and crosslinking only (no saponification) was carried out for 168 hours for some of the membranes. Table 5 lists the tempering conditions and diacetin concentrations used in tempering cellulose acetate membranes, as well as the measured flux and rejection values of cellulose acetate membranes tempered with 5% diacetin that were crosslinked (but not saponified), and of those that were saponified (but not crosslinked). The results demonstrate that diacetin is an effective tempering additive at much lower concentrations than acetic acid. While the cellulose acetate membranes that were tempered with 5% diacetin at 85° C. or 95° C. but not saponified exhibited 0 flux and so were apparently impermeable, after saponification they displayed high fluxes with a substantial rejection of vitamin B12.

TABLE 5

| Diacetin Concentration | Tempering Solution Temperature 75° C. | | Tempering Solution Temperature 85° C. | | Tempering Solution Temperature 95° C. | |
| --- | --- | --- | --- | --- | --- | --- |
| | D* | $R_{B12}$ (%) | D* | $R_{B12}$ (%) | D* | $R_{B12}$ (%) |
| 2% | 11.9 | 87.0 | 9.0 | 87.1 | 5.7 | 98.7 |
| 5%, not saponified | Not determined | Not determined | 0 | Not determined | 0 | Not determined |
| 5%, not crosslinked | Not determined | Not determined | 63.0 | 23.4 | 35.0 | 41.8 |
| 5% | 11.2 | 89.8 | 10.5 | 92.4 | 7.3 | 96.3 |
| 10% | 6.2 | 96.5 | 4.6 | 98.8 | 2.5 | 99.7 |

*D in units of L/m² · h · bar

When crosslinking was carried out for 168 hours for this series of tests, low fluxes in the $R_{B12}$ range of 92% to 96% were observed, but extremely high $R_{B12}$ values of up to 99.7% were attained. Such high rejection values are not achievable by any currently commercially available cellulose hydrate ultrafiltration membrane.

For comparison, 10 samples of the closest commercially available membrane (cellulose acetate Amicon® YC05 with a cut off of 500 Da as specified by the manufacturer) were tested for flux and $B_{12}$ rejection. Measured D values ranged from 2.16 to 7.12 L/m²·h·bar (median=4.0), while $R_{B12}$ values ranged from 92.1% to 99.0% (median=97.6%).

EXAMPLE 3

The same starting membrane of Example 1 was tempered and crosslinked under a number of different conditions, while acetic acid was used as the tempering solution additive. The crosslinking solution consisted of an aqueous solution of 20 wt % butylene glycol dicglycide ether and 40 wt % diglyme. The samples were tested as in Example 1 and the flux values were plotted against the rejection values in the graph comprising FIG. 1. The optimal flux/rejection relationships (the outermost measured points of the connecting line, seen from the origin) were obtained under the conditions listed in Table 6.

TABLE 6

| Tempering | | Crosslinking Solution | | | Flux/Rejection | |
| --- | --- | --- | --- | --- | --- | --- |
| Acetic Acid Conc. | Temp. | NaOH Conc. | Temp. | Time | D* | $R_{B12}$ (%) |
| 20% | 80° C. | 0.4% | 20° C. | 120 h | 4.14 | 99.1 |
| 20% | 80° C. | 0.4% | 20° C. | 48 h | 6.02 | 98.9 |
| 10% | 80° C. | 0.4% | 20° C. | 72 h | 7.37 | 98.3 |
| 10% | 80° C. | 0.4% | 20° C. | 48 h | 8.94 | 97.5 |
| 10% | 80° C. | 0.4% | 20° C. | 24 h | 13.9 | 95.2 |
| 20% | 60° C. | 0.4% | 20° C. | 24 h | 18.8 | 91.2 |
| 10% | 80° C. | 0.2% | 80° C. | 1 h | 26.5 | 82.9 |
| 20% | 70° C. | — | — | 0 h | 77.8 | 33 |
| 10% | 70° C. | — | 80° C. | 4 h | 124.0 | 15.9 |

D* in units of L/m² · h · bar

Referring again to FIG. 1, a line indicated by the measured data was created with a polynomial 5 with approximation, and is designated as an "optimal line." The optimal line is not a theoretical limit of the flux/rejection relationships achievable according to the inventive method, but rather a line connecting the best flux/rejection combinations achieved so far with this method while using vitamin B12 as a test substance.

COMPARATIVE EXAMPLES 1-4

Flux and Vitamin B12 rejection measurements for a number of commercially available prior art membranes having cut off classes of 1 kDa, 3 kDa, 5 kDa and 10 kDa were made in substantially the same manner as in Example 1 and the results were plotted in the graphs comprising FIGS. 2, 3, 4 and 5, respectively. For comparison, the optimal line established from the data of Example 1 has been superimposed in boldface as a dashed line in FIGS. 2-5. The symbols in FIGS. 2-5 have the following meaning: (a) large symbols reflect median values; (b) small symbols reflect individual measured values, (c) boldface dashed lines reflect the optimal line; and (d) other lines reflect individual measured values which are bordered by a thin line. The symbols are assigned as follows:

| Symbol | Line Type |
|---|---|
| × | solid |
| + | dotted |
| □ | dashed |
| ○ | dot-dash |
| optimal line | boldface dashed |

Figure 2:
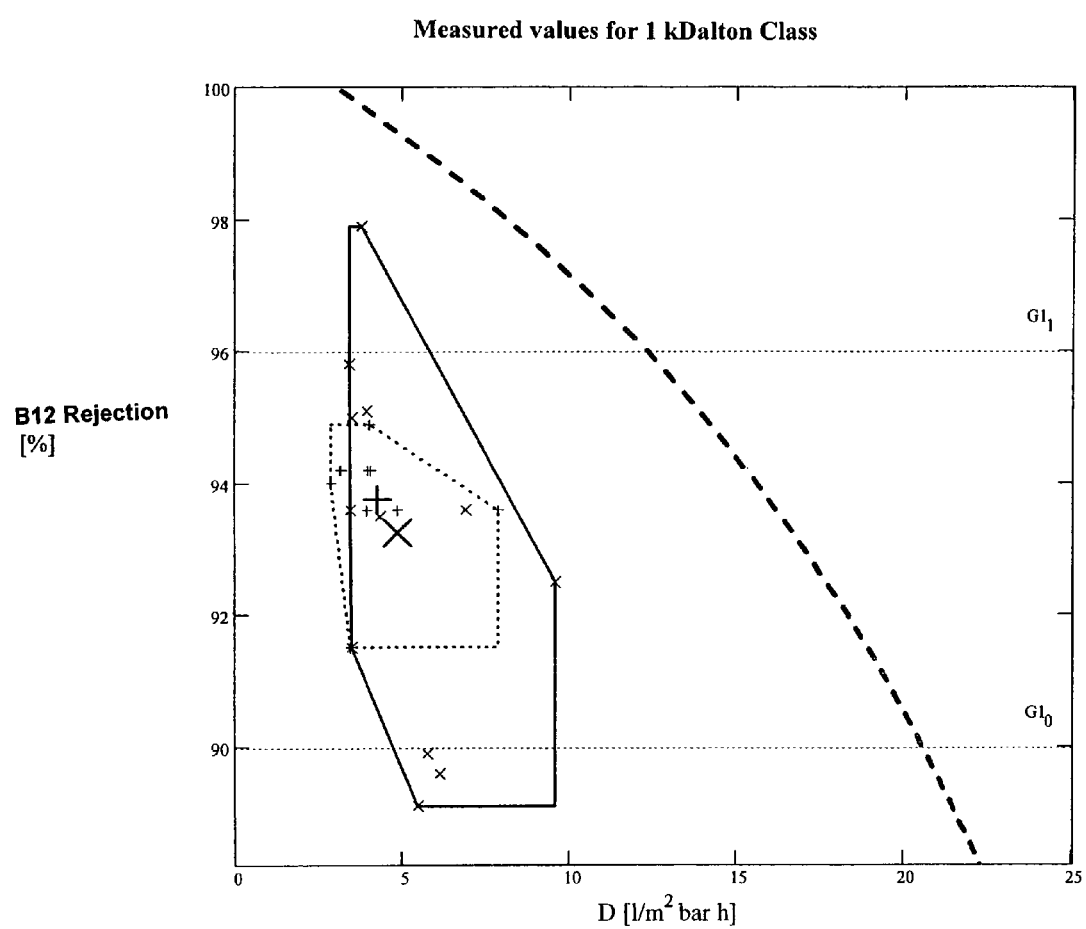
FIGS. 2-5 are graphs of the performance of prior art cellulose hydrate ultrafiltration membranes in the 1 kDa, 3 kDa, 5 kDa and 10 kDa cut off classes, wherein the dashed line represents the optimum relationship between flux and rejection. The meaning of the symbols in FIGS. 2-5 will become apparent from the Examples herein.

Comparative Example 1 sets forth in FIG. 2 the flux and rejection values for two prior art membranes in the 1 kDa cut off class, namely, Millipore® RC 1K and Amicon® YM1.

| Assignment of Symbols in FIG. 2 | |
|---|---|
| Membrane Type | Symbol |
| Millipore ® RC 1K | × |
| Amicon ® YM1 | + |

Figure 3:
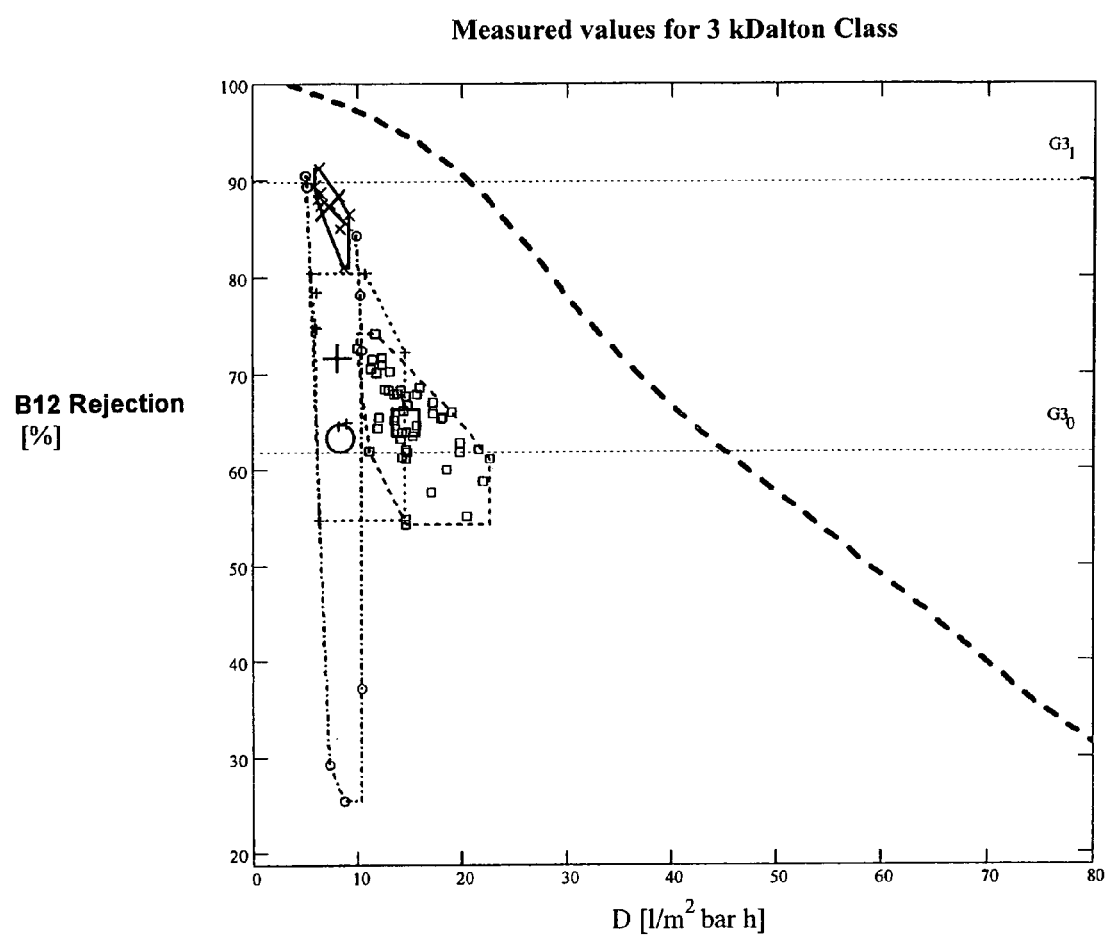

Comparative Example 2 sets forth in FIG. 3 the flux and rejection values for four prior art membranes in the 3 kDa cut off class, namely, Millipore® RC 5K, Amicon® YM3, Hydrosart® 5K and Millipore® RC 3K.

| Assignment of Symbols in FIG. 3 | |
|---|---|
| Membrane Type | Symbol |
| Millipore ® RC 5K | × |
| Amicon ® YM3 | + |
| Hydrosart ® 5K | □ |
| Millipore ® RC 3K | ○ |

Figure 4:
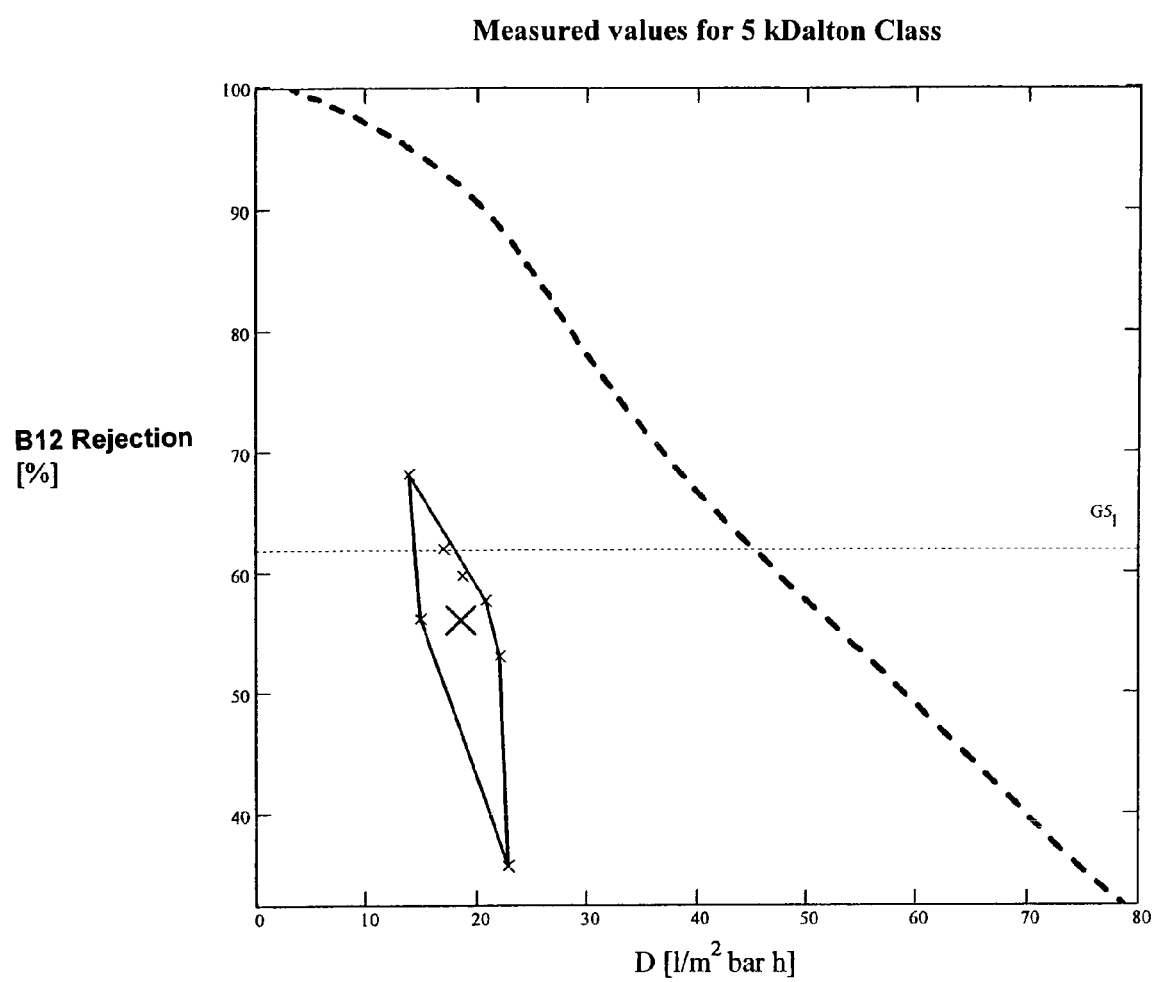

Comparative Example 3 sets forth in FIG. 4 the flux and rejection values for a prior art membrane in the 5 kDa cut off class, namely, Millipore® RC 10K.

| Assignment of Symbols in FIG. 4 | |
|---|---|
| Membrane Type | Symbol |
| Millipor ® RC 10K | × |

Figure 5:
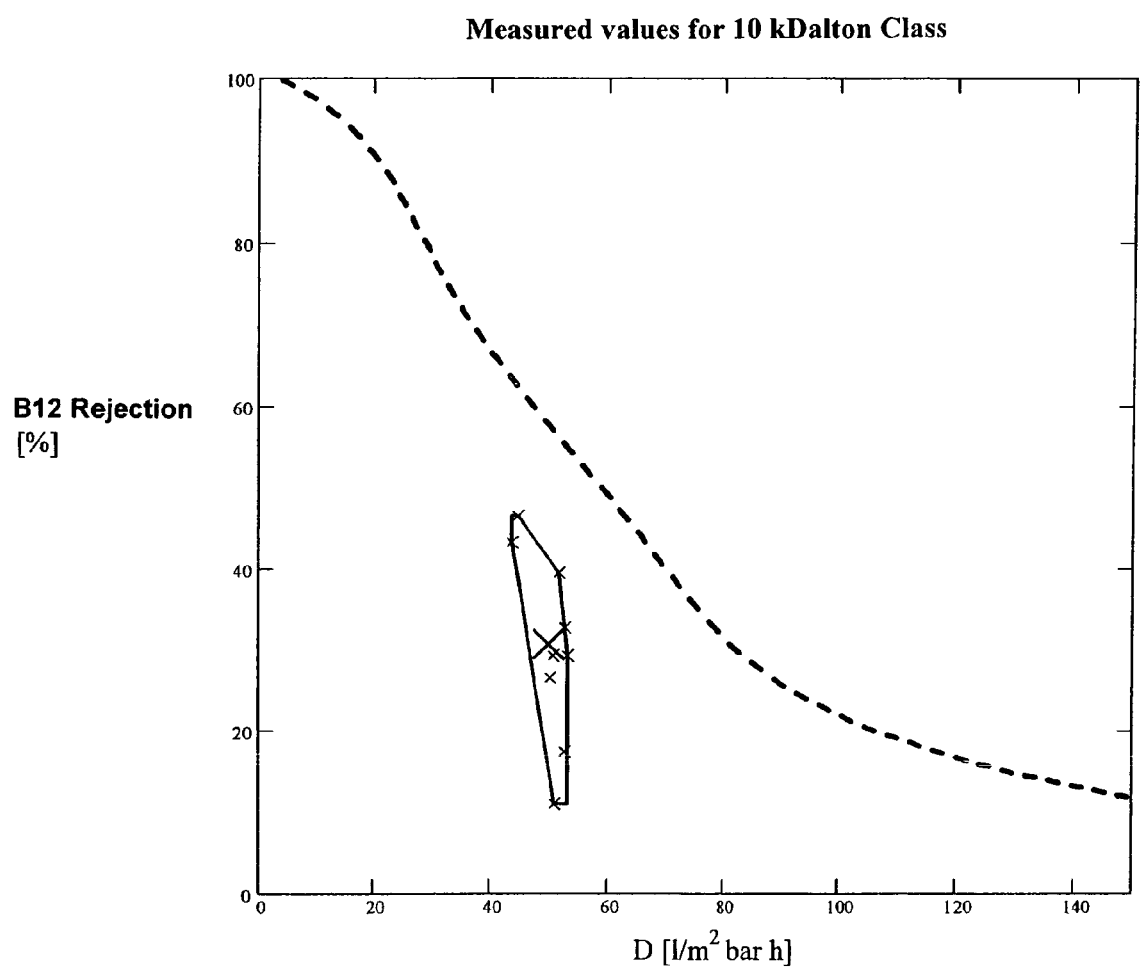

Comparative Example 4 sets forth in FIG. 5 the flux and rejection values for a prior art membrane in the 10 kDa cut off class, namely, Hydrosart® 10K.

| Assignment of Symbols in FIG. 5 | |
|---|---|
| Membrane Type | Symbol |
| Hydrosart ® 10K | × |

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

The invention claimed is:

1. A cellulose hydrate ultrafiltration membrane produced by a process comprising the following steps:
    (a) providing a cellulose ester membrane;
    (b) tempering said cellulose ester membrane of step (a) in a tempering medium to form a tempered cellulose ester membrane; and
    (c) saponifiying the tempered cellulose ester membrane of step (b) to form a cellulose hydrate ultrafiltration membrane.

2. The ultrafiltration membrane of claim 1 wherein said ultrafiltration membrane has an asymmetric structure.

3. The ultrafiltration membrane of claim 1 wherein step (b) is carried out at a temperature in the range from 40° C. to the boiling point of said tempering medium.

4. The ultrafiltration membrane of claim 1 wherein said tempering medium of step (b) contains at least one additive having a dissolving effect on said cellulose ester membrane.

5. The ultrafiltration membrane of claim 4 wherein said additive is selected from the group consisting of acetic acid, diacetin, triacetin and sulfolane.

6. The ultrafiltration membrane of claim 5 wherein the concentration of said additive in said tempering medium is 0.1 to 50 wt %.

7. The ultrafiltration membrane of claim 6 wherein the concentration of said additive is 10 to 30 wt %.

8. The ultrafiltration membrane of claim 7 wherein step (b) is conducted for a period of time ranging from 0.1 second to 1 hour.

9. The ultrafiltration membrane of claim 1 wherein said cellulose ester membrane of step (a) is selected from the group consisting of cellulose monoacetate, cellulose diacetate, cellulose triacetate, cellulose propionate, cellulose butyrate, cellulose acetobutyrate, cellulose nitrate, methyl cellulose, ethyl cellulose and mixtures thereof.

10. The ultrafiltration membrane of claim 1 wherein said cellulose hydrate ultrafiltration membrane of step (c) is crosslinked.

11. The ultrafiltration membrane of claim 1 wherein said process is carried out continuously.

12. The ultrafiltration membrane of claim 11 wherein step (c) is conducted substantially immediately following step (b).

13. The ultrafiltration membrane of claim 1 having a molecular weight cut off of from 500 Da to 10 kDa.

14. The ultrafiltration membrane of claim 13 having a molecular weight cut off of from 500 Daltons to 1000 Daltons.

15. The ultrafiltration membrane of claim 13 having a flux of at least 2 L/m$^2$·h·bar for a membrane in the 400 Dalton cut off class; a flux of at least 10 L/m$^2$·h·bar for a membrane in the 1 kDalton cut off class; a flux of at least 25 L/m$^2$·h·bar for a membrane in the 3 kDalton cut off class; a flux of at least 30 L/m$^2$·h·bar for a membrane in the 5 kDalton cut off class; a flux of at least 60 L/m$^2$·h·bar for a membrane in the 10 kDalton class.

16. The ultrafiltration membrane of claim 14 provided with an integral non-woven fabric reinforcement.

* * * * *